United States Patent
Dittmann et al.

(10) Patent No.: US 7,750,638 B2
(45) Date of Patent: Jul. 6, 2010

(54) MEASURING DEVICE

(75) Inventors: Kark-Heinz Dittmann, Eislingen (DE); Werner Bumen, Kirchheim (DE)

(73) Assignee: Robert Bosch GmbH, Stuttgart (DE)

( * ) Notice: Subject to any disclaimer, the term of this patent is extended or adjusted under 35 U.S.C. 154(b) by 959 days.

(21) Appl. No.: 10/593,369

(22) PCT Filed: Jul. 1, 2005

(86) PCT No.: PCT/EP2005/053152

§ 371 (c)(1),
(2), (4) Date: Sep. 20, 2006

(87) PCT Pub. No.: WO2006/003188

PCT Pub. Date: Jan. 12, 2006

(65) Prior Publication Data

US 2007/0188176 A1    Aug. 16, 2007

(30) Foreign Application Priority Data

Jul. 6, 2004    (DE) .................. 10 2004 032 540

(51) Int. Cl.
    *F02P 17/00* (2006.01)
(52) U.S. Cl. ...................................... 324/378; 324/380
(58) Field of Classification Search ................ 324/378, 324/380
    See application file for complete search history.

(56) References Cited

U.S. PATENT DOCUMENTS

| 4,004,213 A | | 1/1977 | Kato et al. |
| 4,026,621 A | * | 5/1977 | Korba ........................ 439/125 |
| 4,302,724 A | * | 11/1981 | Grover et al. ............... 324/402 |
| 5,376,886 A | * | 12/1994 | Shimasaki et al. .......... 324/402 |

FOREIGN PATENT DOCUMENTS

| EP | 0 167 063 | 1/1986 |
| EP | 0 230 084 | 7/1987 |
| JP | 58068661 | 4/1983 |

\* cited by examiner

*Primary Examiner*—Amy He
(74) *Attorney, Agent, or Firm*—Michael J. Striker

(57) ABSTRACT

A measuring device (1) for detecting signals, particularly signals in an ignition system of an internal combustion engine, has a signal line (2); and a measuring electrode (3) connected to the signal line (2) for coupling a signal to be detected into the signal line (2), wherein the measuring electrode has a flexible tip (4), wherein the tip (4) includes tubular segments (4'); wherein one end of a segment (4') is pivotably inserted into another end of another segment (4'); and wherein the tip (4) including the tubular segments (4') is lockable into position in a bent state.

11 Claims, 2 Drawing Sheets

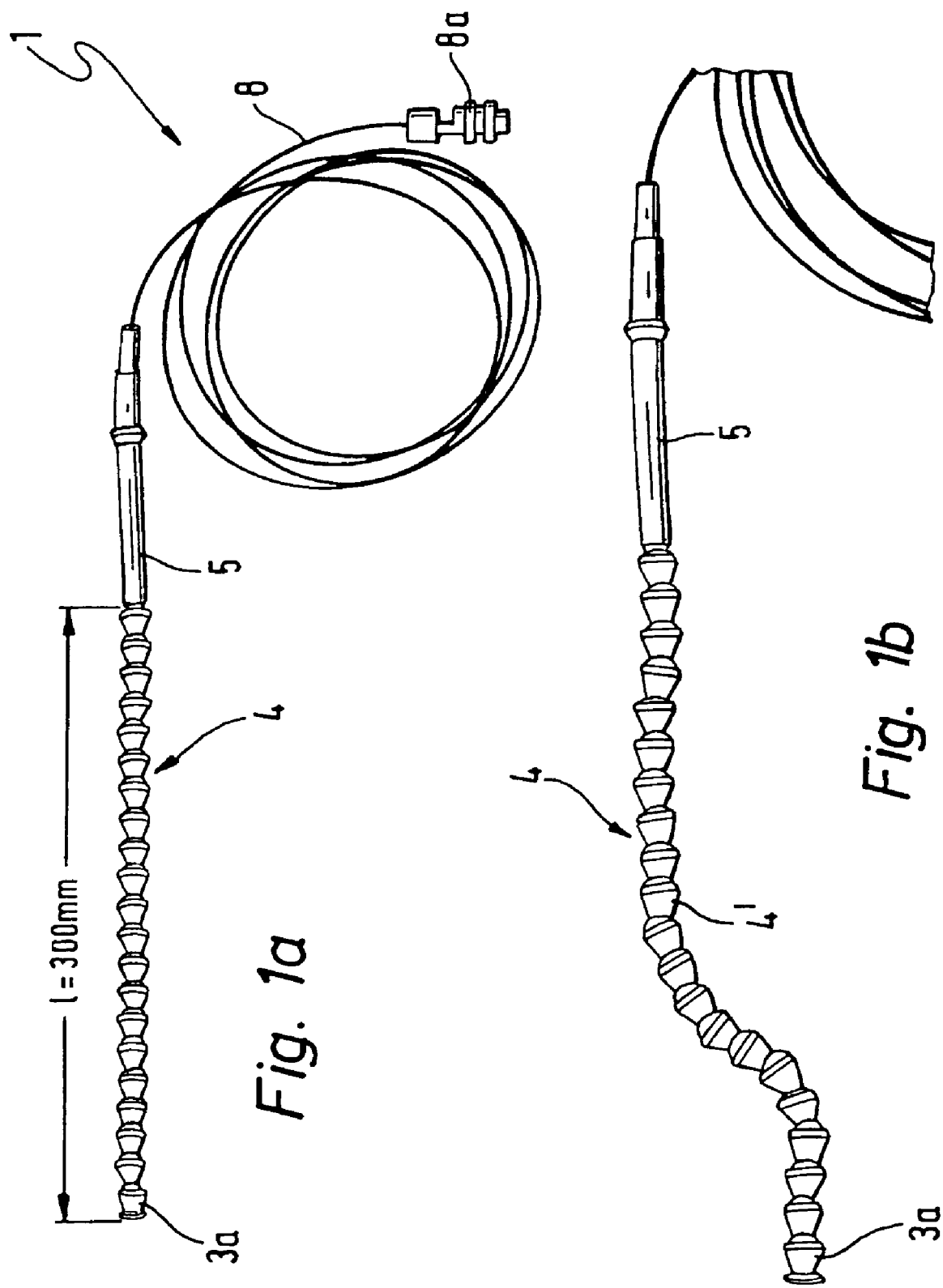

MEASURING DEVICE

CROSS-REFERENCE TO A RELATED APPLICATION

The invention described and claimed hereinbelow is also described in German Patent Application DE 10 2004 032 540.5 filed on Jul. 6, 2004. This German Patent Application, whose subject matter is incorporated here by reference, provides the basis for a claim of priority of invention under 35 U.S.C. 119(a)-(d).

BACKGROUND OF THE INVENTION

The present invention relates to a measuring device for detecting signals, particularly signals in an ignition system of an internal combustion engine, with a signal line and a measuring electrode connected to the signal line for coupling a signal to be detected into the signal line.

Measuring devices of this type are known from the related art. They have the disadvantage that ignition systems or other systems to be investigated that are installed in inaccessible areas are difficult or impossible to reach. It is therefore often necessary to remove the components to be investigated, which is time-consuming and increases the costs to perform measurements on components of this type.

The object of the present invention, therefore, is to improve a measuring device of the type described initially such that components installed in inaccessible areas can also be easily reached or need not be removed to be measured, and such that the measuring device is adaptable to many different installation situations and components to be measured.

This object is attained with the measuring device described initially by the fact that a flexible tip is provided. The flexible tip makes it possible to adapt the measuring device to the spacial conditions of the components to be measured and to the installation space around it. The inventive measuring device also makes it possible to easily and quickly adapt the measuring device to the shape and size of the components to be measured, so that, when switching between several different objects to be measured, little effort is required to adapt the measuring device.

A very advantageous embodiment of the inventive measuring device is characterized by the fact that the length of the tip is variable.

A further variant of the present invention with which the tip is modular in design is also very advantageous. The modular design of the tip enables an even more flexible adaptation of the measuring device to the particular object to be measured. With a tip having a modular design, it is also possible to adjust the length of the tip freely, e.g., by adding or removing individual modules of the tip as necessary. The length of the tip is preferably specified at the time of manufacture, although it is also possible to change the length in the field.

A further embodiment of the present measuring device is characterized by the fact that the tip includes tubular segments; one end of a segment is pivotably inserted into another end of another segment. This ensures maximum flexibility of the measuring device and the tip of the measuring device, with a simple design.

A particularly advantageous configuration of the tubular segments is described in European patent application 0 167 063 A1, the entirety of which is included in the present description. Similar commercial products are known, e.g., under the brand name LOC-LINE, from Lockwood Products (vgl. http://www.loc-line.com, http://www.loc-line.de). These tubular segments are known for use, e.g., to transport fluids, e.g., cooling water for machine tools. They are available in different sizes.

SUMMARY OF THE INVENTION

Segments with an inner diameter of approximately ¼ inches are preferably used for the inventive measuring device. The segments are composed, e.g., of an acetal copolymer and have a maximum application temperature of approx. 76° C., and a melting point of approx. 165° C.

A further very advantageous embodiment of the present invention is characterized by the fact that the tip is designed as a flexible tube.

A further very advantageous embodiment of the present invention is characterized by the fact that it is also possible to lock the tip in a bent state. As a result, the flexible tip of the measuring device retains a bend once it has been set, even when no external forces are applied. With the embodiment of the tip—described above—in the shape of the tubular segments, e.g., according to EP 0 167 063 A1, the inventive lockability in position is given by the fact that the individual tubular segments do not move relative to each other when no external forces are applied, because they are held together by clamping pressure.

A similar effect can also be attained when the flexible tip of the measuring device is designed as a flexible tube, e.g., by locating a metal spring around the tube, which holds the tube in a specified bent shape.

According to a further very advantageous embodiment of the present invention, the measuring electrode is designed as a capacitive primary detector. In this case, an electrically conductive, i.e., galvanic connection between an object to be measured and the measurement electrode is not required.

The measuring device can be used, e.g., to detect the ignition voltage course in an ignition coil of an internal combustion engine. Due to the high flexibility of the measuring device with its flexible tip, the measuring device can be adapted to the measurement environment, e.g., by bending, thereby rendering it unnecessary to remove the ignition coil to be investigated to measure it. The tip of the measuring device is easily held on a surface of the ignition coil or near it to capacitively detect the ignition voltage course.

A further advantageous embodiment of the present invention is characterized by the fact that the measuring electrode includes a cap that is preferably detachably connected with the measuring electrode.

According to another very advantageous embodiment of the present invention, the cap is a different color than the flexible tip of the measuring device, to further simplify handling of the measuring device. It is also feasible to provide the cap with other marking means, e.g., illumination. Illumination can also be provided in other areas of the tip.

Particularly advantageously, and according to a further embodiment of the present invention, the cap is designed such that it can be placed on a holder provided therefore on an object to be measured or on an ignition coil.

A further advantageous embodiment of the inventive measuring device provides that the signal line includes a preferably single-core, shielded line, in particular a coaxial line or another cable, e.g., a high-voltage cable.

When a coaxial cable or another shielded line is used, it is also possible to remove part of the outer line or the shielding in the area of the tip, so that signals to be detected can be coupled into the area of the measuring electrode and in a part of an inner conductor of the coaxial cable extending in the tip, by way of which effective coupling capacity is increased. As a result, e.g., measurements can be carried out simultaneously on several ignition coils and objects to be measured, which couple their particular signal into a corresponding, non-shielded part of the inner conductor or signal line.

According to a further advantageous embodiment of the present invention, the measuring electrode and/or the cap and/or the tip and/or a handle of the measuring device include fastening means for fastening at least part of the measuring device. As a result, the inventive measuring device can be fixed in a position on the object to be measured, so that an operator need not hold the measuring device in place while the measurement is carried out.

Another advantageous embodiment of the inventive measuring device is characterized by a preferably capacitive voltage divider, which divides a voltage signal coupled into the signal line via the measuring electrode into a lower voltage value. This voltage divider can be located, e.g., in the handle or in a connector of the measuring device.

As an alternative, the voltage divider can also be provided in a section of the modular tip of the measuring device provided especially for this purpose, and corresponding connections for the signal line to the voltage divider are provided on the voltage divider.

Instead of the capacitive primary detector, the measuring electrode can also be designed as a contact tip, i.e., to detect signals in a galvanically coupled manner.

On the end of the signal line opposite to the tip, the measuring device can include a multiterminal plug, with which the signal line can be connected directly, e.g., to a diagnostic tester for automotive ignition systems or to other measurement and evaluation devices.

A further very advantageous embodiment of the inventive measuring device is characterized by the fact that the illumination is supplied externally, in particular via a separate power cord or the signal line, and/or by the fact that the illumination has a separate power supply, such as a battery. Use of the measuring device simply as a lamp is also feasible.

BRIEF DESCRIPTION OF THE DRAWINGS

Further advantages and details of the present invention are indicated in the description of the figure, below, with reference to the drawing, in which FIG. 1a shows an initial embodiment of the present measuring device, FIG. 1b shows the measuring device in FIG. 1a in a bent state.

DESCRIPTION OF THE PREFERRED EMBODIMENTS

Figure 1C:
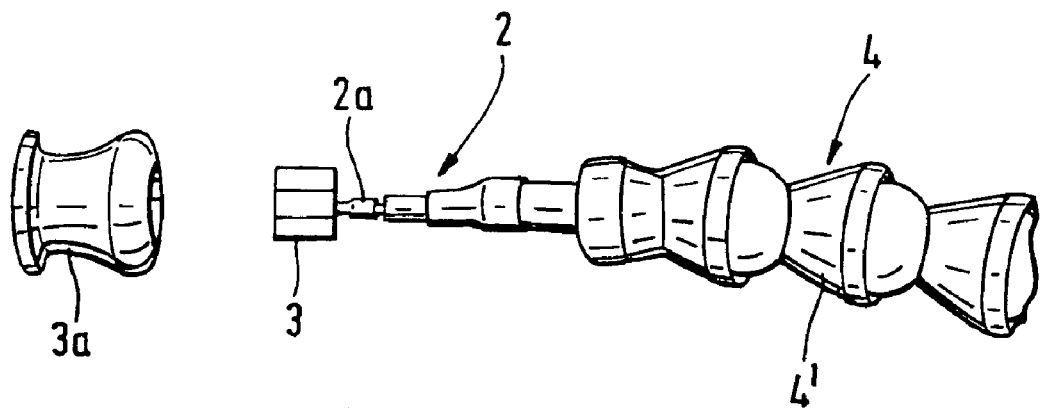
FIG. 1c shows an enlarged depiction of the tip of the measuring device with the measuring electrode.

FIG. 1a shows inventive measuring device 1, which includes a handle 5 and a tip 4 placed on handle 5. A cap 3a is placed on tip 4, which is 300 mm long (shown on the left in FIG. 1a).

Furthermore, measuring device 1 includes a cable 8 and a multiterminal plug 8a, which is provided to connect cable 8 with a diagnostic and measuring device. Measuring device 1 can be connected directly via plug 8a to a diagnostic tester 7' (see FIG. 2) for automotive ignition systems.

As shown in FIG. 1b, flexible tip 4 of measuring device 1 can be bent into nearly any shape, and the individual tubular segments 4' of tip 4 are pivoted relative to each other. An exact description of segments 4' is provided in European patent application 0 167 063 A1.

To couple a signal to be detected into signal line 2 shown in FIG. 1c using measuring device 1, inventive measuring device 1 is provided with a measuring electrode 3, which is connected with an inner conductor 2a of signal line 2 designed as a coaxial cable. In the present embodiment, cable 8 is the extension of signal line 2.

In a further embodiment of measuring device 1, instead of coaxial cable 2, a high-voltage cable (not shown) can also be used as signal line 2, the high-voltage cable including, e.g., an inner conductor guided into an insulating jacket.

Cap 3a is provided to protect the measuring electrode 3, which functions as a capacitive primary detector; it can be inserted onto and removed from measuring electrode 3. It is therefore ensured that cap 3a can be easily replaced. Cap 3a is preferably composed of a non-conducting plastic.

To also simplify use of inventive measuring device 1 on inaccessible objects to be measured and/or under conditions of poor visibility, the color of cap 3a is distinctly different from the color of the rest of tip 4 of measuring device 1. For example, the color of cap 3a is bright red.

With a further embodiment of measuring device 1, a defined wall thickness and geometry of cap 3a, e.g., in the shape of a ball, and a defined shape of measuring electrode 3, ensure that measuring electrode 3 is held a specifiable distance away from an object to be measured (not shown) when the object to be measured is touched with the tip of measuring device 1 or with cap 3a itself.

Figure 2:
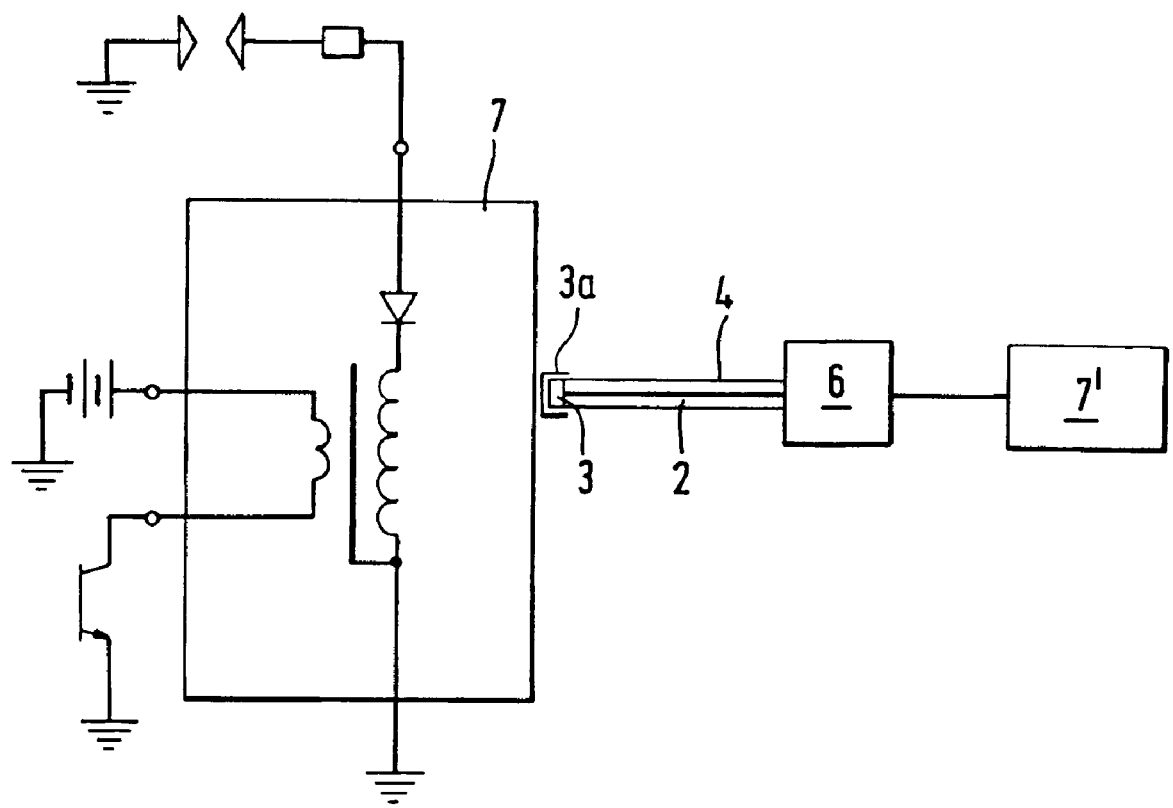
FIG. 2 shows a schematic depiction of the measuring device on an ignition system.

FIG. 2 shows a schematic circuit layout, which illustrates the use of measuring device 1. FIG. 2 shows an ignition coil 7, which is the object to be measured. Measuring electrode 3, which is protected by cap 3a, is held against the surface of ignition coil 7. Due to the close distance between measuring electrode 3 and ignition coil 7, capacitive coupling of ignition coil 7 with measuring electrode 3 is given, so that electrical fields in ignition coil 7 are coupled into coaxial cable 2 and/or its inner conductor 2a (FIG. 1c) connected with measuring electrode 3. As shown in FIG. 2, coaxial cable 2 is guided inside tip 4 formed by segments 4' (FIG. 1c).

A capacitive voltage divider 6 (FIG. 2) is integrated in handle 5 (FIG. 1a) of measuring device 1. Capacitive voltage divider 6 carries out an impedance transformation before the detected signal is supplied to a diagnostic circuit or a diagnostic tester 7'. The connection between capacitive voltage divider 6 and diagnostic tester 7' is realized using cable 8 (FIG. 1a).

With a further, not-shown embodiment of the present invention, the capacitive voltage divider is integrated in plug 8a.

Overall, inventive measuring device 1 makes it possible to detect signals in a very flexible manner, even in inaccessible areas. Particularly advantageously, segments 4' of tip 4 also provide mechanical protection for signal line 2 integrated in tip 4.

Furthermore, the modular design of tip 4 also makes it possible to adapt inventive measuring device 1 to highly diverse spacial conditions and objects to be measured. When the system described in European patent application 0 167 0 63 and known by the trademark name LOC-LINE, the modularity of segments 4' allows the length of tip 4 to be adapted very easily. Preferably, segments 4' with an inner diameter of ¼ inch are used.

The measuring device is suited, in particular, for use to measure ignition systems of motor vehicles that are often located in inaccessible areas, and to perform measurements on other systems.

Measuring device 1 is particularly suited for quickly locating signals in engines with several ignition coils. Due to the flexible design of tip 4, it is possible, advantageously, to move very quickly from one ignition coil to the next ignition coil within the framework of a single measurement.

Particularly advantageously, measuring device 1 includes fastening means (not shown), with which measuring device 1 can be attached to the object to be measured, or near it.

According to a further embodiment of the present invention, cap 3a includes illumination (not shown), which is supplied with current via signal line 2. To this end, a disconnector (not shown) is provided in plug 8a, for example, which separates the coupled-in signals to be detected from the direct current to the illumination.

As an alternative, the illumination can also be supplied with electricity via a separate, not-shown power cord, which—similar to signal line 2—can extend inside tip 4 or outside of it. With a further embodiment, a battery is provided to supply electricity to the source of illumination.

With a further embodiment of the present invention, inner conductor 2a is not enclosed by a grounded protective conductor, at least over a measuring section extending inside tip 4, so that signals can couple into this measuring section, just as they can couple into measuring electrode 3. Starting from measuring electrode 3 (FIG. 1c), the measuring section can extend, e.g., for 200 mm of the 300 mm-long tip 4 shown in FIG. 1a. This allows, e.g., signals from various ignition coils to be coupled into inner conductor 2a simultaneously.

What is claimed is:

1. A measuring device (1) for detecting signals, particularly signals in an ignition system of an internal combustion engine, said measuring device comprising a signal line (2); and a measuring electrode (3) connected to the signal line (2) for coupling a signal to be detected into the signal line (2), wherein the measuring electrode is characterized by a flexible tip (4), wherein the tip (4) includes tubular segments (4'); wherein one end of a segment (4') is pivotably inserted into another end of another segment (4'); and wherein the tip (4) including the tubular segments (4') is lockable into position in a bent state.

2. The measuring device (1) as recited in claim 1, wherein the length of the tip (4) is variable.

3. The measuring device (1) as recited in claim 1, wherein the tip (4) is modular in design.

4. The measuring device (1) as recited in claim 1, wherein the measuring electrode (3) is designed as a capacitive primary detector.

5. The measuring device (1) as recited in claim 1, wherein the measuring electrode (3) includes a cap (3a) that is preferably detachably connected with the measuring electrode (3).

6. The measuring device (1) as recited in claim 5, wherein the cap (3a) is a cap selected from the group consisting of a cap which is a different color than the tip (4), a cap including other marking means and both.

7. The measuring device (1) as recited in claim 1, wherein the signal line (2) includes a preferably single-core, shielded line, in particular a coaxial line or a high-voltage cable.

8. The measuring device (1) as recited in claim 1, wherein an element selected from the group consisting of the measuring electrode (3), the cap (3a) the tip (4), a handle (5), and a combination thereof include fastening means for fastening at least part of the measuring device (1).

9. The measuring device (1) as recited in claim 1, wherein a preferably capacitive voltage divider (6) is provided.

10. The measuring device (1) as recited in claim 1, wherein an element selected from the group consisting of the tip (4), the cap (3a) and both is illuminated.

11. The measuring device (1) as recited in claim 10, wherein the illumination is the illumination selected from the group consisting of an illumination which is supplied externally, in particular via a separate power cord or the signal line (2), an illumination which has a separate power supply, and both.

* * * * *